Figure 1:
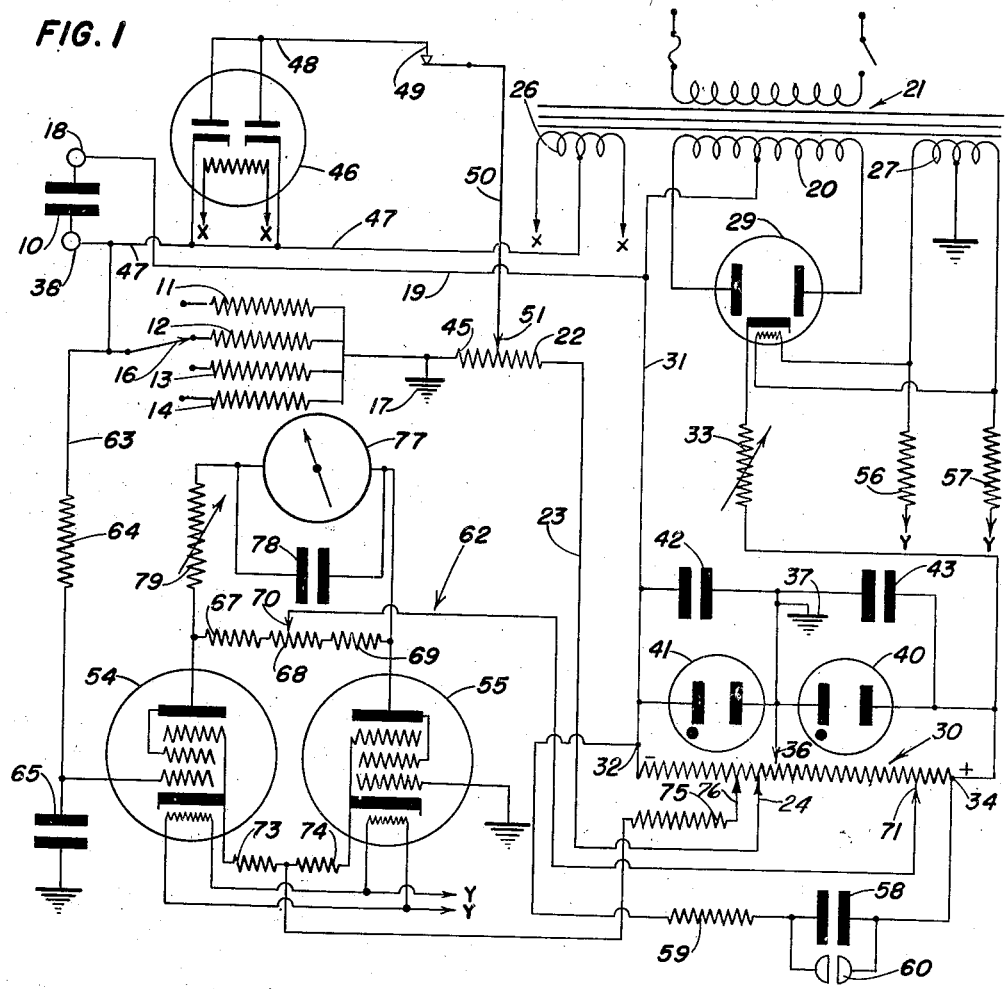

Oct. 25, 1949.    B. S. MELTON    2,485,902
CONDENSER
Filed Aug. 20, 1946

INVENTOR
BENJAMIN S. MELTON
BY M. O. Hayes
ATTORNEY

Patented Oct. 25, 1949

2,485,902

UNITED STATES PATENT OFFICE 2,485,902

CONDENSER

Benjamin S. Melton, Silver Spring, Md., assignor to the United States of America as represented by the Secretary of the Navy Application August 20, 1946, Serial No. 691,854

3 Claims. (Cl. 320—1)

The present invention relates to circuits and methods for measuring the characteristics of capacitors and, while it has a considerable range of prospective application, it is of particular utility in measuring the leakage resistance or dielectric resistance of capacitors.

The leakage resistance of capacitors is normally very high. For a one microfarad paper capacitor an acceptable minimum might be 25 megohms, and this figure may attain a value of 2500 megohms or more. Resistances of this order of magnitude are usually measured in practice by placing a resistor in series with the capacitor under test, by charging the capacitor to a predetermined potential through a time-constant circuit comprising the capacitor and this resistor, and by then measuring the voltage drop across this resistor. The last mentioned voltage drop is a function of the leakage current of the capacitor and therefore the leakage resistance may readily be calculated.

An object of the invention is to provide an arrangement and method for expediting the making of such measurements, since the charging of capacitors is a process that requires an appreciable time when the time constant of the charging circuit is very long.

It is well known that capacitors have specified voltages at which they are designed to operate continuously, and other specified voltages at which they are tested, the latter voltages being usually much the higher. The leakage resistances of the same capacitor differ for different applied voltages, and it is therefore an important object of the present invention to maintain desired specific constant voltages across the capacitors which are being measured, as distinguished from unknown or variable voltages applied in certain previously known circuits.

Where the voltage of a source of charging current is known and the resistance of the series resistor is also known, the dielectric resistance is readily measured by measuring the voltage drop in that series resistor. Care must be taken, however, that a charging equilibrium has been attained before reading an indication of that potential drop, since the charging current may continue to flow for a long time, determined by the time constant of the charging circuit.

A dilemma is presented by certain conflicting but desirable characteristics of the series resistor. Since the leakage current is determined by measuring the voltage at the terminals of the series resistor, and since usually this current is very small, it is on the one hand desirable to employ one having a large resistance in order to obtain a reasonable voltage drop. On the other hand, in order to attain a condition of equilibrium as quickly as possible in charging the capacitor, it is desirable to employ a series resistance of low magnitude.

The present invention solves the problem so presented by providing means in shunt with the series resistor and of such a nature as to present a low resistance to the flow of charging current during most of the period of capacitor charge, but so devised that the resistance automatically becomes very high near the end of the charging period. The providing of a high linear resistance and a non-linear impedance in shunt therewith, both the resistor and the impedance device being included in the charging path of the capacitor under test, results in an arrangement which satisfies both requirements.

This result is attained by utilizing the cathode-anode resistance path of an electronic tube as an auxiliary impedance in parallel with the series resistor and by causing the impedance of this path to vary in response to the state of charge of the capacitor.

This arrangement effects great time-savings in the commercial testing of capacitors on a production basis, since it permits measurements to be made after a relatively short capacitor-charging time.

The circuit parameters hereinbelow given are furnished by way of illustration and not of limitation. Specifically, since it is a general characteristic of electronic tubes that the impedance of the cathode-anode path may be varied from a relatively low value substantially to infinity by varying the voltages applied to the electrodes, it is manifest that many different types of tubes may be employed to secure the desired results and within the spirit and scope of this invention.

Figure 2:
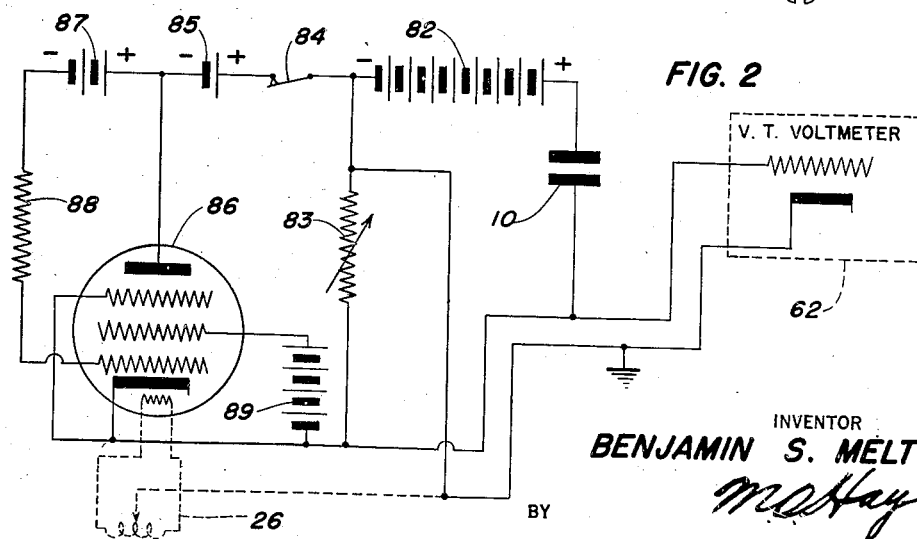

For a better and further understanding of the present invention together with other and further objects thereof, reference is made to the accompanying specification, to the claims appended thereto, and to the accompanying drawing in which:

Figure 1 is a diagram of a preferred form of testing circuit in accordance with the present invention, and in which a double-diode is employed as the non-linear impedance; and Figure 2 is a diagram of a modified form of testing circuit in which a pentode is utilized as the non-linear impedance.

Referring now specifically to Figure 1 there is illustrated a capacitor 10, constituting the sample under test. The circuit arrangement functions in such a manner as to provide indications from which the leakage resistance of this capacitor may be found. In order to charge this capacitor there is provided a time-constant circuit comprising capacitor 10 and any one of the selectable resistors 11, 12, 13 and 14 (25,000 ohms, 250,000 ohms, 2,500,000 ohms, and 25,000,000 ohms respectively). The operator may include any one of these resistors in the time-constant circuit by appropriately positioning the arm 16 of a selector switch. Each of the above-mentioned four resistors is provided with a contact which may be placed in circuit with this arm and the resistor leads remote from the switch contacts have a common junction grounded at point 17. Terminal 18 of the capacitor is connected by conductor 19 to the center tap on high potential secondary winding 20 of a power transformer 21. This power transformer and a rectifier constitute a source of charging current of which the last-named center tap is the negative terminal. The grounded junction 17 of resistors 11-14, inclusive, is connected through a resistor 22 (10,000 ohms) to a selected point of the power supply, by a conductor 23 and a movable tap 24, in the present instance, to the left of another movable tap 36, which is grounded at 37.

Referring now specifically to the conventional power supply it comprises transformer 21, designed for connection to a suitable alternating current source (115 volts), and having a high-voltage secondary portion 20, a low-voltage secondary portion 26, and a low voltage secondary portion 27 (6.3 volts). The terminals of the high voltage secondary are connected to the anodes of a full-wave rectifier tube 29 (6X5). The rectifier terminals are brought out to a bleeder resistor 30 (50,000 ohms, 100 watts), the negative terminal being connected by conductor 31 to terminal 32 and the positive terminal being connected through a variable resistor 33 (5,000 ohms) to terminal 34. Movable tap 36 on resistor 30 is grounded at 37, so that the voltages available at all points to the right of tap 36, that is between tap 36 and terminal 34, are positive, while voltages to the left of tap 36, that is between tap 36 and terminal 32, are negative, with respect to ground. It will therefore be seen that terminal 38 of capacitor 10 is the positive charging terminal, since it is electrically connected to tap 24, which is positive with respect to terminal 32, through the selected resistor and resistor 22, while terminal 18 of the capacitor 10 is the negative charging terminal since it is connected directly to terminal 32. In order to stabilize the voltages between terminal 34 and tap 36 and between tap 36 and terminal 32, respectively, there are provided voltage-regulating tubes 40 (VR75) and 41 (VR150), respectively. An individual one of capacitors 42 and 43 (each 40 microfarads) is placed in shunt across a respective one of the voltage-regulating tubes. These capacitors form part of the filter circuit of the conventional power supply.

It will be seen that, no matter which one of the selectable resistors is switched in the charging path of capacitor 10, a long time-constant circuit is involved, with the result that a considerable time is consumed in charging capacitor 10. In order to reduce this time there is provided in shunt with the selected one of these resistors 11-14, inclusive, and with portion 45 of resistor 22 the cathode-anode path of a double diode 46 (6H6). The cathodes of this tube are connected by conductor 47 to terminal 38 and the anodes are connected through conductor 48 and keying switch 49, conductor 50 and movable tap 51 to resistor 22. During the time of charging of capacitor 10 a substantial current flows through resistor 22 and the voltage drop in the series combination comprising portion 45 of resistor 22 and the selected one of the resistors 11-14, inclusive, is such as to make the anodes of tube 46 strongly positive with respect to its cathodes. The result is that electrons rapidly and easily flow through terminal 38, through conductor 47, the cathode-anode path of tube 46, conductor 48, keying switch 49, and conductor 50, on to tap 51 and the positive terminal 24 of the charging source. The capacitor is therefore rapidly charged. However, near the end of the charging period when the capacitor 10 has been substantially fully charged to the predetermined potential applied thereto from the power source the current through portion 45 of resistor 22 and the selected one of the resistors 11-14, inclusive, is relatively small and the positive bias applied to the plates of tube 46 by reason of this current flow is insufficient to overcome the negative bias applied to the plates by the drop in portion 45. This drop occurs by reason of the fact that tap 24 is at a negative potential (minus 12 volts) with respect to ground 17. The result is that tube 46 becomes non-conductive and thereafter acts as an impedance of infinite magnitude between terminal 38 and tap 51. During the remaining part of the charging cycle capacitor 10 is charged through the long time-constant circuit comprising portion 45 of resistor 22 and the selected one of resistors 11-14, as if tube 46 were not present.

The heating elements of tube 46 are connected to secondary winding 26, which serves as their source of heating current (as indicated by the letters X—X). The cathodes are also connected to the center tap on secondary winding 26. Secondary winding 27 serves as the source of heating current for tubes 29, 54 and 55, as indicated by the letters Y—Y. Resistors 56 and 57 (each 0.5 ohm) are inserted in the leads from secondary 27 to the filaments of tubes 54 and 55 as a means of lowering the filament voltage of these tubes, which results, in turn, in lowering their grid current, to improve their operation as elements of a vacuum tube voltmeter.

The circuit arrangement also includes a timing device, provided for the purpose of indicating to the operator the number of seconds of duration of the charging period. This circuit comprises a time-constant timing circuit consisting of a capacitor 58 (5 microfarads) and a resistor 59 (12 megohms) in series between terminals 32 and 34. Capacitor 58 is continually being charged through resistor 59 and it periodically discharges through a neon glow lamp 60 in shunt with condenser 58. The timing circuit is so arranged that the lamp glows about once every second. Preferably the lamp is of 0.25 watt rating.

In order to indicate the value of the leakage current in the selected one of resistors 11, 12, 13 and 14 and thus make it possible to compute the leakage resistance of capacitor 10, there is provided a conventional vacuum tube voltmeter arrangement indicated generally at 62. The voltmeter is designed to indicate the voltage between terminal 38 and ground 17 caused by the flow of leakage current from capacitor 10 through the selected one of the resistors 11-14, inclusive. Accordingly, terminal 38 is coupled by a circuit including conductor 63, resistor 64 (4,000 ohms) and capacitor 65 (0.03 microfarad) to the control electrode of tube 54. The remaining terminal of the capacitor 65 is grounded and thus effectively connected to point 17. The tubes 54 and 55 of the volt meter are arranged in a bridge circuit, their plates being connected by a series combination of resistors 67, 68 and 69 (20,000 ohms, 7,500 ohms and 20,000 ohms, respectively). A plate potential (90 volts) is applied to the plates of those tubes by connecting tap 70 on resistor 68 to tap 71 on resistor 30, and by connecting the junction of cathode resistors 73 and 74 (2,500 ohms each) through resistor 75 (50,000 ohms) to tap 76 on resistor 30. Since tap 76 is at a point of approximately minus 50 volts potential with respect to ground and since tap 71 is at a point of approximately plus 40 volts with respect to ground a 90 volt potential difference exists between the plates of tubes 54 and 55 and their respective cathodes. The screen grids are connected to the plates and are at plate potential and the suppressor grids are connected to the cathodes and are therefore at cathode potential. The control electrode of tube 55 is grounded. The use of the two tubes and bridging arrangement in the voltmeter balances out the static operating plate current of tube 54, so that the whole scale of meter 77 (in shunt with the series combination of resistors 67, 68 and 69 and having a maximum reading of 100 microamperes) may be used. The tubes form arms of a Wheatstone bridge. The static operating plate current is balanced out by adjusting the position of tap 70. The two tubes respond similarly to changes of plate-supply voltage and cathode temperature, so that the bridge does not readily become unbalanced by undesirable factors. The application of a signal to the input circuit of tube 54 by reason of leakage current flow through the selected time-constant circuit causes an unbalance to appear between the plate voltages of tubes 54 and 55, the unbalance being functionally related to the magnitude of the leakage resistance current in capacitor 10. Meter 77 indicates this unbalance and it may be calibrated in terms of that leakage resistance.

A capacitor 78 (16 microfarads) is connected in shunt across meter 77, as a means of retarding the application of sudden voltage surges to the meter, since such surges might damage the moving element, even though of insufficient duration to overheat the meter windings.

A variable resistor 79 (2,500 ohms) is included in series with meter 77, in order to facilitate setting thereof.

The operation of the above described circuit is as follows: When capacitor 10 is connected to terminals 18, 38, a constant voltage (150 volts) between the positive grounded point 17 and terminal 18 charges capacitor 10 through the selected one of the resistors 11–14, inclusive. Bridged across the selected resistor, however, is the plate circuit of tube 46. The polarities indicated are such that the plates are positive with respect to the cathodes of tube 46, so that charging current flows through the double diode in shunt to the selected one of the resistors.

The diode current continues to flow as long as the plates remain positive with respect to the cathodes. Since the point 17 is grounded, it is at approximately the same potential as tap 36 on resistor 30. The potential of tap 51 drops to zero and then to a negative value when the current flow through the selected resistor has dropped to a relatively small value, near completion of the charging of capacitor 10. At this time diode 46 becomes non-conductive and has the same effect as though it were open-circuited.

The net result is that while the capacitor is charging at an appreciable rate, the diode acts as a low-resistance shunt to the charging resistor, thus expediting the charging, but near completion of the charge the diode acts as an infinite resistance and has no further influence on the current flowing through the charging resistor. The voltage across the terminals of the charging resistor is then measured with the electronic voltmeter to indicate the current flowing through the resistor, from which the leakage resistance of capacitor 10 is then determined. The voltmeter may be calibrated in terms of this leakage resistance.

The keying switch 49 provides a convenient expedient for disconnecting the quick-charge diode. If for some reason the diode had insufficient bias, as would be the case if tap 51 were moved too close to the grounded side of resistor 22, it would then act as a shunt resistor across capacitor 10 even after the capacitor was charged. The result would be an erroneous indication of leakage resistance. A simple check that this condition does not exist is made by opening switch 49 and noting that the meter reading does not change.

Referring now to Fig. 2, there is illustrated a modified form of the invention, predicated upon the same basic principle of providing a rapid charge by using the plate circuit of an electronic tube, which plate circuit is a non-linear impedance, as a shunt to the charging resistor.

Here the source of voltage is indicated as a battery 82 (200 volts) and capacitor 10 is charged by this battery through a time-constant circuit comprising the capacitor and a variable charging resistor 83 (1 to 10 megohms). In shunt relationship to the resistor 83 is a circuit comprising the normally closed push-button switch 84, the battery cell 85, and the cathode-anode circuit of a pentode 86. The plate potential of the tube is the same as that of the positive terminal of battery 82, diminished by the voltage of cell 85 and by the drop across capacitor 10. The control electrode is also at a positive voltage with respect to the cathode, which voltage is equal to the plate voltage minus the voltage of a battery 87 (3 volts), a series combination of battery 87 and a protective grid resistor 88 (4.5 ohms) being connected between the control grid and the plate of the tube. The screen grid is provided with an appropriate source of potential 89. A large space current for charging capacitor 10 flows through the pentode as long as the voltage drop across the resistor 83 is high. However, when the charging of the capacitor approaches completion, the drop across the capacitor becomes nearly equal to the voltage of battery 82, the voltage drop in resistor 83 becomes small and finally is less than the potential of battery 87 (minus 3 volts), so that the grid becomes negative with respect to the cathode. The single cell 85 (1.5 volts) is provided for the purpose of offsetting or bucking any contact potential that might interfere with the desired results.

Obviously many modifications and variations of the present invention are possible in the light of the above teachings. It is therefore to be understood that within the scope of the appended claims the invention may be practiced otherwise than as specifically described.

I claim:
1. Apparatus for expediting the charging of a capacitor, which comprises a source of electricity of suitable voltage, a resistor whose conductance is low relative to the capacitance of the capacitor to be charged, said resistor being connected in series with said source and said capacitor, a device having unilateral electrical conductivity, said device being connected in parallel with said resistor, and in the proper sense to be conductive at the time the charging commences, and circuit connections whereby the polarity of the voltage applied to the device will be reversed by and in response to the voltage drop across said resistor as the charging of said capacitor approaches completion, for facilitating measurement of electrical characteristics of the capacitor.

2. Apparatus as defined in claim 1, wherein the device having unilateral conductivity is an electronic discharge device including at least two electrodes, only one of which can act as a cathode.

3. The process of expediting the charging of a capacitor, as a preliminary step in measuring the insulation resistance of said capacitor, which comprises charging said capacitor from a source of electricity through a composite path which includes a portion having pure ohmic resistance partially in parallel with a portion having unilateral resistance, and causing the voltage drop across the ohmic resistance to reverse the polarity applied to the unilateral resistance, at some point in the progress of the charging, whereby said unilateral resistance will become indefinitely large.

BENJAMIN S. MELTON.

REFERENCES CITED

The following references are of record in the file of this patent:

UNITED STATES PATENTS

| Number | Name | Date |
|---|---|---|
| 1,786,910 | Jones | Dec. 30, 1930 |
| 1,983,665 | Hickok | Dec. 11, 1934 |
| 2,121,725 | Baumzweiger | June 21, 1938 |
| 2,190,488 | Schnoll | Feb. 13, 1940 |
| 2,410,735 | Hoisington | Nov. 5, 1946 |
| 2,412,542 | Smith | Dec. 10, 1946 |